United States Patent
Gray et al.

(10) Patent No.: US 6,818,842 B2
(45) Date of Patent: Nov. 16, 2004

(54) SEAT FOAM HUMIDITY COMPENSATION FOR VEHICLE SEAT OCCUPANT WEIGHT DETECTION SYSTEM

(75) Inventors: Charles A. Gray, Noblesville, IN (US); Robert K Constable, Kokomo, IN (US); John G. West, Sharpsville, IN (US); James F. Patterson, Greentown, IN (US); Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 181 days.

(21) Appl. No.: 10/325,538

(22) Filed: Dec. 19, 2002

(65) Prior Publication Data

US 2004/0118619 A1 Jun. 24, 2004

(51) Int. Cl.$^7$ .......................... B60R 21/32; G06F 17/00
(52) U.S. Cl. .......................... 177/144; 701/45; 180/273; 280/735
(58) Field of Search ........................ 180/273; 280/735; 701/45; 177/136, 144, 210 R (56) References Cited

U.S. PATENT DOCUMENTS

| | | | |
|---|---|---|---|
| 6,012,007 A | 1/2000 | Fortune et al. | 701/45 |
| 6,151,540 A | 11/2000 | Anishetty | 701/45 |
| 6,246,936 B1 | 6/2001 | Murphy et al. | 701/45 |
| 6,438,476 B1 | 8/2002 | Gray et al. | 701/45 |
| 6,438,477 B1 | 8/2002 | Patterson et al. | 701/45 |
| 6,479,766 B2 | 11/2002 | Gray et al. | 177/144 |
| 6,542,802 B2 | 4/2003 | Gray et al. | 701/45 |
| 6,578,871 B2 | 6/2003 | Gray et al. | 280/735 |
| 6,587,770 B1 | 7/2003 | Gray et al. | 701/45 |
| 6,644,689 B2 * | 11/2003 | Murphy | 280/735 |

* cited by examiner

*Primary Examiner*—Randy W. Gibson
(74) *Attorney, Agent, or Firm*—Stefan V. Chmielewski (57) ABSTRACT

A vehicle seat occupant classification system uses a pressure responsive, fluid filled bladder and pressure sensor adapted for engagement with an underside of a foam seat cushion so as to generate a pressure signal corresponding to the weight of an occupant on an upper side of the foam seat cushion. A humidity sensor responds to relative humidity of air adjacent the pressure sensor and/or foam seat cushion to generate a humidity signal that is used to compensate at least one of the pressure signal, a stored reference pressure value and a stored threshold value, from which at least in part; an occupant classification is determined. The system preferably includes a time delay between the reading of a humidity value and the full use of that humidity value in compensation; and the time delay may be responsive to an activity factor derived from dynamic variations in the pressure signal associated with a pumping action on the foam tending to increase the rate of exchange of air between the foam and the atmosphere outside the foam. Preferably, the temperature adjacent the pressure sensor and/or foam seat cushion is also determined and used in conjunction with the humidity signal to provide au additional cross-correlation compensation.

20 Claims, 7 Drawing Sheets

SEAT FOAM HUMIDITY COMPENSATION FOR VEHICLE SEAT OCCUPANT WEIGHT DETECTION SYSTEM

TECHNICAL FIELD

The technical field of this invention is an occupant weight detection system for a vehicle seat with a foam seat cushion.

BACKGROUND OF THE INVENTION

Vehicle occupant restraint device controls are now being designed to distinguish seat occupants by weight and use this information in determining, in the case of a crash, whether or not to deploy a restraint and, if so, with what force. One type of vehicle seat occupant weight detecting system uses a force or pressure sensor under a foam seat cushion on which an occupant sits; and a particular type of force or pressure sensing apparatus is a non-compressible fluid filled bladder comprising an array of cells in fluid communication with each other and a pressure sensor connected to the interior of the bladder to measure the fluid pressure therein.

Systems of this type have had to be refined to accurately distinguish between two or more classes of vehicle occupants defined in certain governmental regulations; and this refinement involves, among other things, compensation for certain mechanical and/or environmental effects inherent in the apparatus that tend to distort the output pressure signal from that indicating the true weight of the occupant. It has been discovered that one of these effects is relative humidity within the foam material of the seat cushion, which affects the force/pressure transmitting properties of the foam and thus the relationship between the weight of a seat occupant and the pressure exerted on pressure sensing apparatus under the seat cushion. Although the prior art includes references to correcting the output of occupant weight sensors for humidity of the air, such references deal with systems having sensors, such as open capacitive sensors or ultrasound reflective sensors, in which the sensor itself is sensitive to humidity. It has not been known in the prior art that it would be necessary or advantageous to correct for humidity in the seat foam when the sensor was itself not significantly affected by humidity.

Testing has shown that there can be a significant time delay between a change in relative humidity of the air adjacent the foam and a change in the humidity level within the foam. The foam material includes a large number of very small air pockets, only a small proportion of which are close to the outer surface of the foam cushion. In addition, the seat foam is usually covered with a material that further impedes air flow in and out of the foam. Exchanges in air flow between the seat foam and the atmosphere are propelled by "foam activity": that is, compression of the foam to expel a portion of the air within, followed by release of the compression to allow the foam to expand and pull in external air. In the absence of "foam activity" it can take a very tong, time for the average humidity within the foam to adjust to that outside the foam; but in the presence of such activity, the response can be significantly faster.

Furthermore, some foam seat cushions tend to exhibit a cross-correlation effect between relative humidity and temperature, most probably due to the facts that (1) the humidity effect on a foam seat cushion appears to vary with the absolute amount of water in the foam and (2) the relationship between the measured relative humidity and the absolute humidity in air can vary in a strongly non-linear manner with changes in temperature. In some cases, the cross-correlation effect can be as great as the effect of humidity alone.

SUMMARY OF THE INVENTION

The invention described and claimed herein provides a humidity compensated vehicle seat occupant classification system with pressure responsive apparatus adapted for engagement with an underside of a foam seat cushion so as to respond to a weight of an occupant on an upper side of the foam seat cushion and generate a pressure signal therefrom. In the system, a humidity sensor is adapted to respond to relative humidity of air adjacent the pressure responsive apparatus to generate a humidity signal. The humidity signal is used to compensate at least one of the following: the pressure signal, a stored reference pressure value and/or a stored threshold value. The occupant classification is determined at least partly in response to the compensated one of the pressure signal, the stored reference pressure value and the stored threshold value. In a preferred embodiment, a stored reference pressure value representing an empty seat pressure is compensated; and in another preferred embodiment, the stored threshold value is also compensated.

Preferably, the system includes a time delay between the reading of a humidity value and the full use of that humidity value in compensation, and the time delay is preferably variable according to an activity factor of the foam seat cushion derived from dynamic variations in the pressure signal associated with a pumping action on the foam tending to increase the rate of exchange of air between the foam and the atmosphere outside the foam. In a preferred embodiment, the activity factor is derived by counting consecutive, alternating excursions of signal magnitude above a first predetermined level and below a second predetermined level lower than the first predetermined level.

Preferably, the temperature adjacent the foam seat cushion or the pressure sensor is further used with the humidity signal to generate a cross-correlation value for further compensating whichever of the pressure signal, the stored reference pressure value and the stored threshold value is humidity compensated. This cross-correlation value may be derived from a product of tile humidity and temperature signals and may further be derived from a product of the humidity signal and the square of the temperature signal.

BRIEF DESCRIPTION OF THE DRAWINGS

The present invention will now be described, by way of example, with reference to the accompanying drawings, in which.

DESCRIPTION OF THE PREFERRED EMBODIMENT

Figures 1, 2:
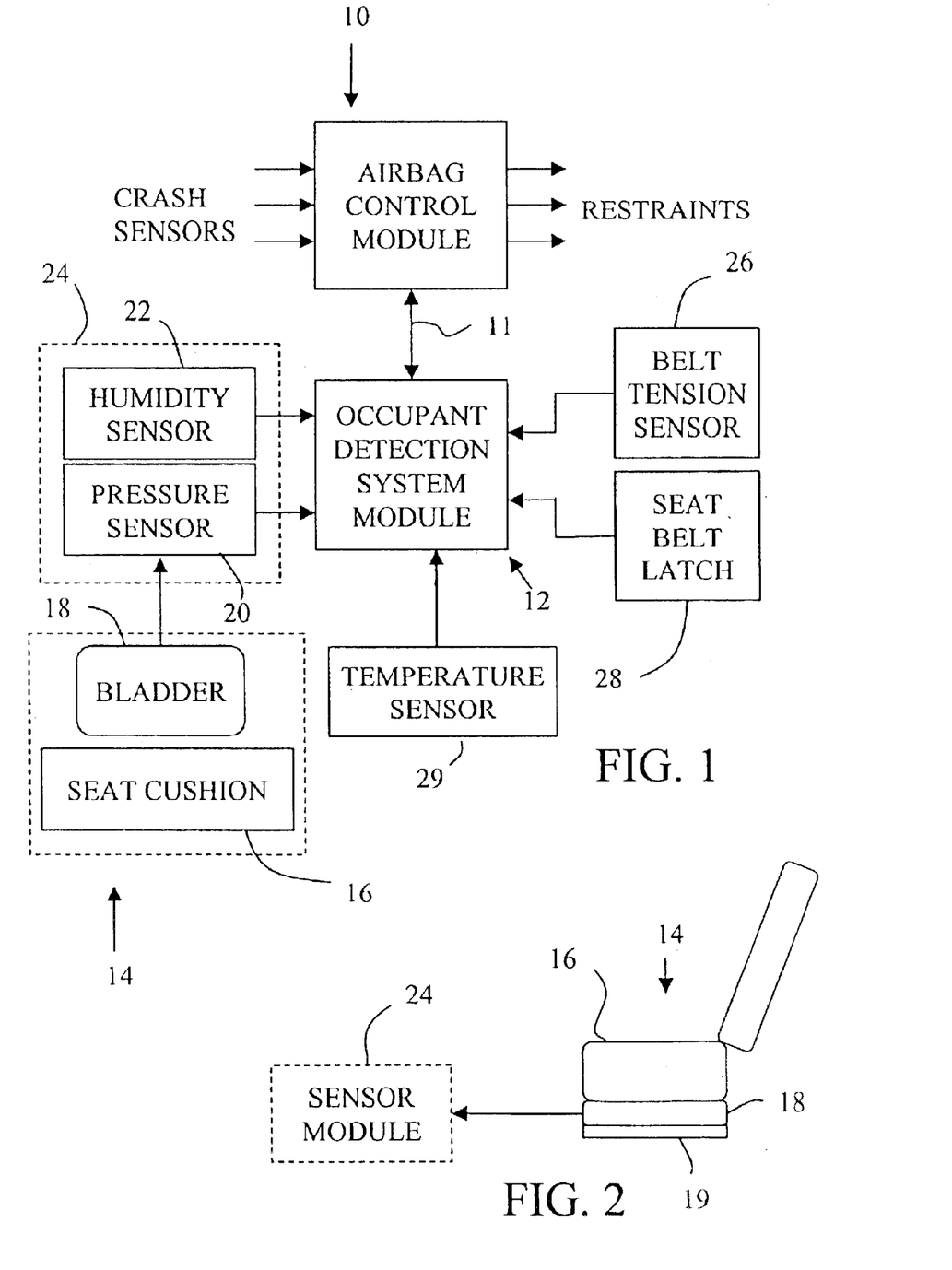
FIG. 1 is a block diagram of an occupant weight detection system for a vehicle seat with a foam seat cushion providing compensation for humidity within the seat cushion foam.
FIG. 2 shows a seat with pressure sensing apparatus under the seat cushion.

A vehicle passive restraint control system comprises an airbag control module (ACM) 10 that receives signals from crash sensors, not shown, and provides deploy signals as required to airbags, not shown. The crash sensors and airbags may be any such articles known in the art for use in vehicle restraint systems. A vehicle seat 14 is provided with a seat cushion member 16, generally comprising a shaped block of foamed material providing a comfortable seating support, usually covered in a fabric for protection, desired surface qualities and appearance. A bladder 18 packaged with seat cushion member 16 is typically located under seat cushion member 16 but above a seat pan member 19, as shown in FIG. 2, and is filled with a non-compressible fluid so as to generate a pressure in the fluid in response to the weight of a seat occupant on the seat cushion member. The pressure in the fluid is sensed by a pressure sensor 20 in a sensor module 24 that, together with bladder 18, forms a seat characteristic sensor apparatus providing an output signal of the weight born by seat cushion member 16. An example of pressure sensing apparatus such as bladder 18 and pressure sensor 20 is shown in U.S. Pat. No. 5,987,370, issued Nov. 16, 1999. A relative humidity sensor 22, which produces an output humidity signal, is also provided, preferably and conveniently along with pressure sensor 20 within sensor module 24. The output signals of both pressure sensor 20 and humidity sensor 22 are provided to an occupant detection system module 12, which includes a controller such as a programmed digital microcomputer, not shown. Occupant detection system module 12 may also receive signals from other sensors such as a seat belt tension sensor 26 or a seat belt latch sensor 28, and it communicates with airbag module 10 over a bus 11. A temperature sensor 29 may provide a temperature signal to module 12; and a preferred location for sensor 29 is in the sensor module 24, although it is not so shown in FIG. 1, due to lack of space.

Figure 3A:
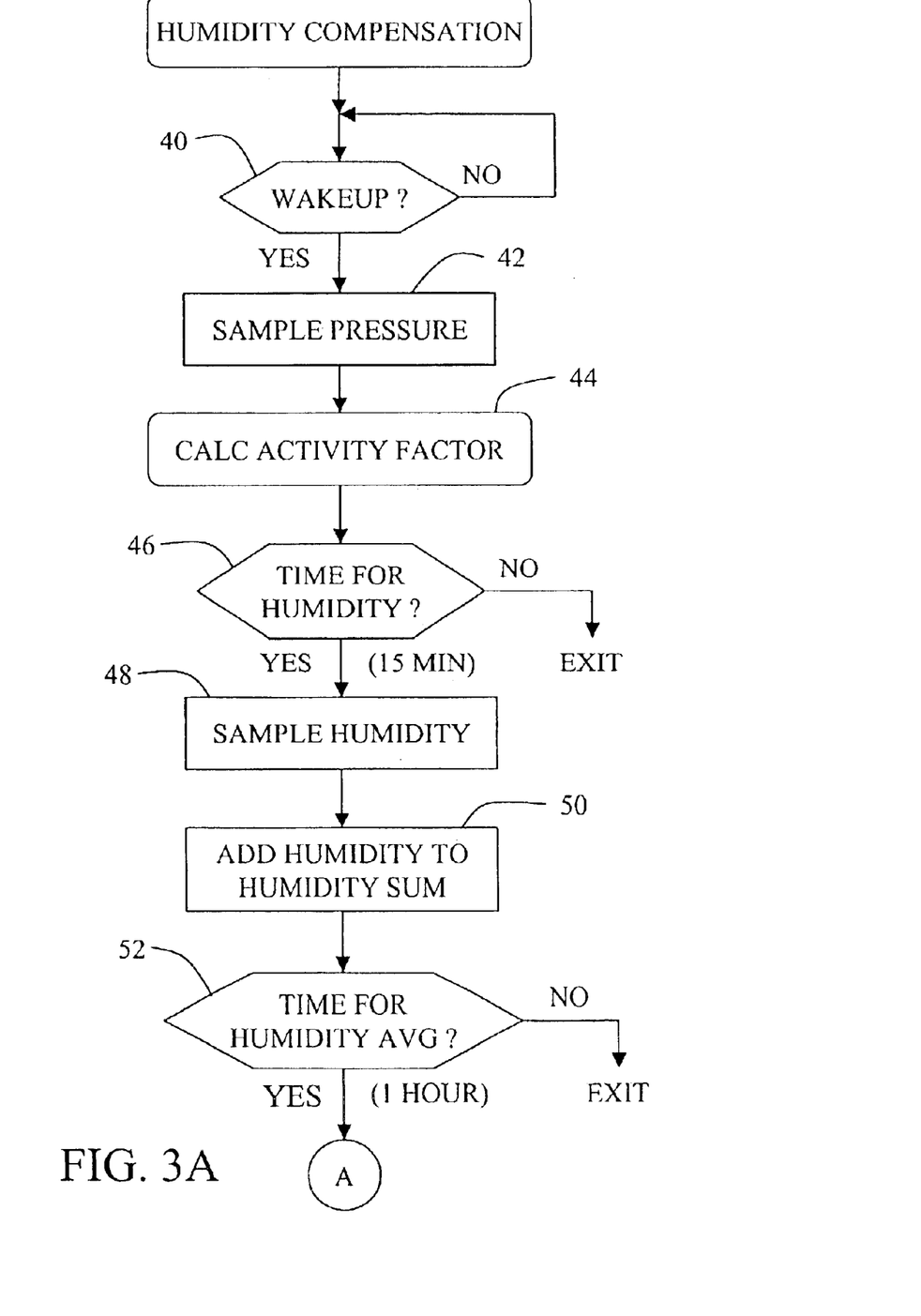
FIGS. 3A, 3B and 4 show a computer flow chart for a humidity compensation algorithm for use in the system of FIGS. 1 and 2.
Figure 3B:
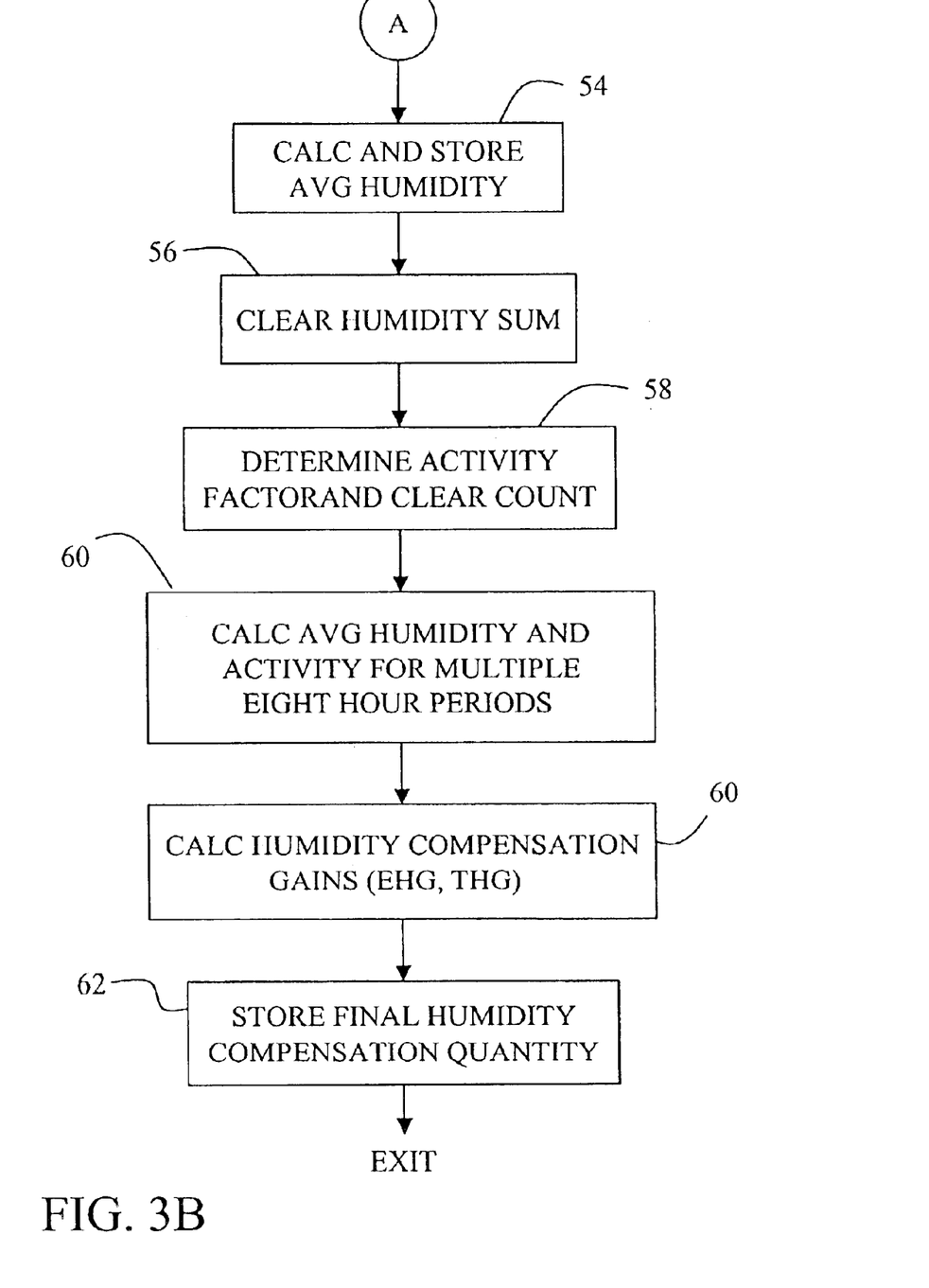

FIGS. 3A and 3B show a computer flow chart illustrating the operation, relative to the invention, of a microcomputer in occupant detection system module 12 in a routine HUMIDITY COMPENSATION. The microcomputer, in a low power sleep mode, looks for a time-based wakeup signal at step 40 and repeats the step until the wakeup signal is received. As the computer wakes up to full operation, it receives a sample pressure reading from pressure sensor 20 at step 42 and updates an activity factor at step 44. The activity factor is a measure of the rate at which the foam in seat cushion 16 is compressed and released, and thus of the rate at which the air within seat cushion 16 is replaced by atmospheric air. Most air pockets within the foam are comparatively distant from the external surface, through tortuous paths so that the exchange rate of air with the external atmosphere is very slow in the absence of an occupant sitting on the seat and generating a pumping action thereon by movements, whether active or passive (due to road bumps, etc.). The process described herein monitors changes in pressure in the bladder under seat cushion 16 to determine the activity thereof and determines a count indicative of the activity rate as described with reference to the subroutine CALC ACTIVITY FACTOR of FIG. 4.

Figure 4:
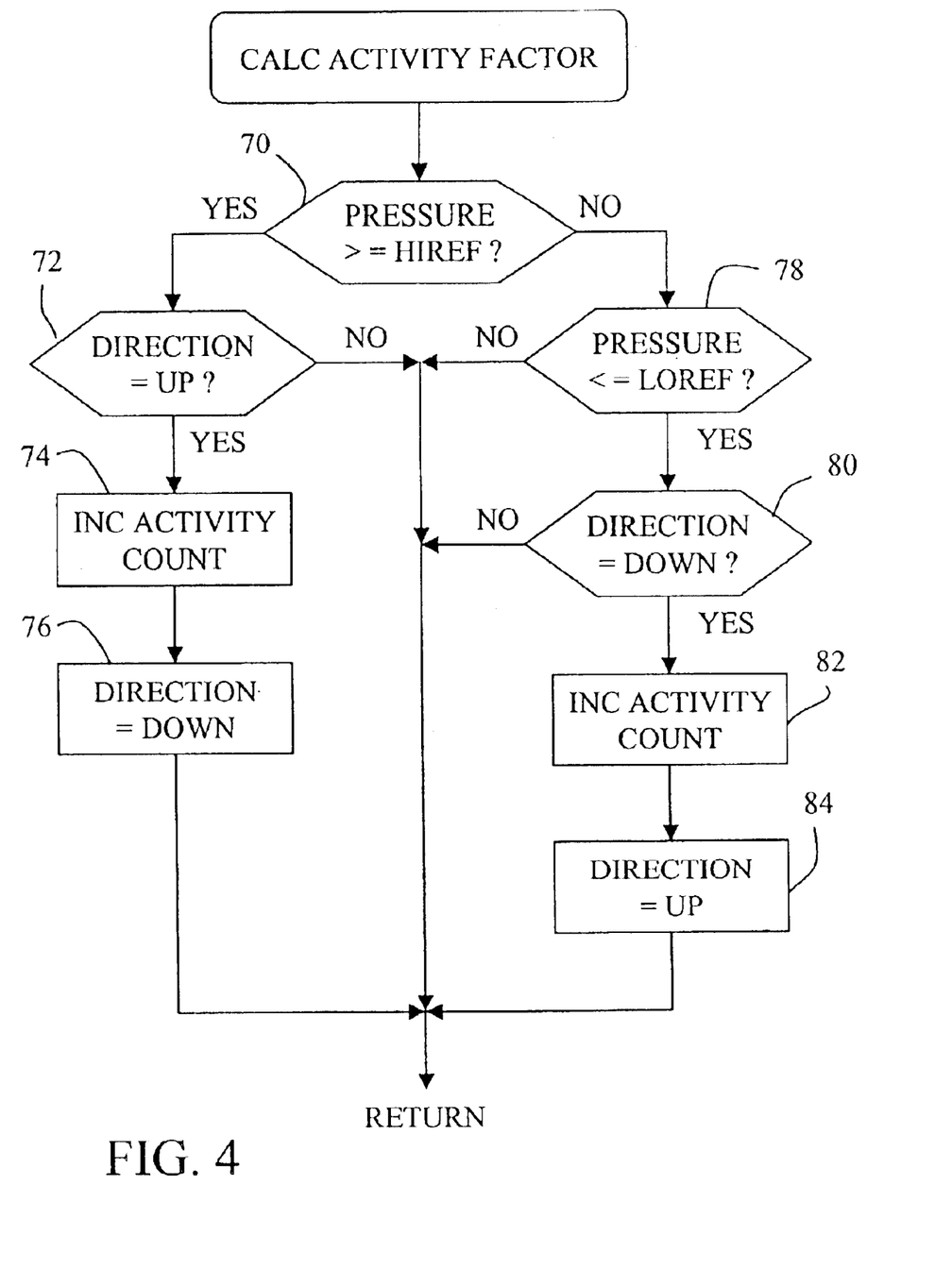

The basic operation of the CALC ACTIVITY FACTOR subroutine is to monitor the pressure signal and determine excursions between predetermined low and high values, incrementing a count with each complete excursion. Thus, after the pressure level falls below the predetermined low value, a count is incremented when it next exceeds the predetermined high level; and after this excursion higher than the high level, the count is incremented an when the level once again falls below the low level. Thus, the more seat activity that causes the bladder pressure to swing up to the high level and down to the low level, the higher will be the activity factor. A higher value of the activity factor indicates a more rapid replacement of air within the foam and thus a smaller time delay between the sensing of a humidity value outside the foam by humidity sensor 22 and the achievement of the same humidity value within seat cushion 16; a low value indicates the opposite.

Referring to FIG. 4, the subroutine begins at step 70 by determining if the pressure value is greater than or equal to a predetermined reference value HIREF. If it is, the subroutine then checks a direction flag at step 72 to determine whether the relevant direction is up or down: that is, whether the subroutine was looking for the high reference value HIREF (direction=up) or a predetermined low reference value LOREF (direction=down). The two predetermined reference values determine the pressure range defining an activity count, and the direction flag prevents the count from being incremented before full travel between the reference values has occurred. If the direction flag indicates down, program flow returns to the main program. But if the direction flag indicates up, the subroutine increments ACTIVITY COUNT at step 74 and sets the direction flag at step 76 to indicate DOWN before returning to the main program.

From step 70, if the pressure is not greater than or equal to HIREF, the subroutine determines at step 78 if it is less than or equal to the predetermined reference value LOREF, which is lower in value than HIREF. If it is not, program flow returns to the main program. If it is less than or equal to LOREF, the subroutine determines at step 80 if the direction flag indicates DOWN: that is, if it is looking for the LOREF value. If the answer is no, program flow returns to the main routine; but if the answer is yes, the subroutine increments ACTIVITY COUNT at step 82 and sets the direction flag to indicate UP before program flow is returned to the main routine. The value of ACTIVITY COUNT is available at any time in memory to be used as the activity factor by the main routine in compensation calculations.

In a variation of the routine described above, an extra step or subroutine is inserted at the beginning, prior to step 70. This extra step updates an average value of the pressure signal and determines or modifies the values of HIREF and LOREF to bracket the updated average value. Thus, when the seat has an occupant for a continuous period of time who provides small magnitude vertical force inputs to the seat foam due to road inputs through the suspension or due to shifting position in the seat, the pressure values will be optimally aligned to cross both of references HIREF and LOREF. When the average value drops toward zero after the occupant leaves the seat, the values of HIREF and LOREF may revert to predetermined values greater than zero.

Returning to the main routine in FIG. 3A, the routine determines at step 46 if it is time to sample the humidity sensor. This is done at specified time intervals which are typically significantly greater than the intervals between pressure readings since humidity changes significantly affecting the foam in seat cushion 16 do not generally occur very quickly. A typical time interval might be 15 minutes. The choice of the time interval is a choice in a specific case: more frequent sampling might provide faster response to humidity changes under some conditions; but it might also generally produces a greater accumulated round-off error and will generally increase current draw from the vehicle battery and thus increase chances of draining the battery when the vehicle is not used for a long period. If Such a time interval has not passed since the last humidity reading, the routine exits. If it has passed, the humidity sensor signal is sampled at step 48 and the value of the reading is added to a temporarily stored value HUMIDITY SUM.

The routine then determines at step 52 if it is time to calculate an average humidity value HUMIDITY AVG. In this embodiment the average is calculated every hour: that is, after every four consecutive samples (at 15 minute intervals) of the humidity sensor. If it is not time to calculate the average value, the routine is exited; but if the time has come, the routine determines and stores the average value at step 54 (FIG. 3B). The average value is calculated by dividing the value of HUMIDITY SUM, which is the temporarily stored sum of the last four consecutively sampled values of the humidity sensor output signal, by the number four (or whatever other number of samples have been summed). The resulting value of HUMIDITY AVG is stored in memory as the latest in an ordered array of previously calculated average humidity values. The temporarily stored value of HUMIDITY SUM is then cleared to zero at step 56. In addition, the routine next, at step 58, determines the ACTIVITY FACTOR for the previous hour by storing the value of ACTIVITY COUNT accumulated over the hour and then clearing, the ACTIVITY COUNT to zero.

The routine next begins the calculation of the compensation gains, which is done every hour, but using data going back over a 48 hour period. First, at step 60, the routine determines average humidity values and activity factors for each of 6 consecutive, previous eight hour periods. The average humidity value for the previous eight hour period is calculated as follows:

$$T_{0\ to\ -7}=(\Sigma T_0 H + T_{-1} H + \ldots + T_{-7} H)/8$$

Wherein the summed terms are the values of HUMIDITY AVG for each of the previous eight hours. Similar average values are calculated for each of the eight hour periods $T_{-8\ to\ -15}$, $T_{-16\ to\ -23}$, $T_{-24\ to\ -31}$, $T_{-32\ to\ -39}$ and $T_{-10\ to\ -47}$. The total activity factor for each of the eight periods is also determined as the sum of the stored activity factors for all one hour periods within the eight hour period.

With average humidity values and total activity factors for each of the six eight hour periods calculated, the routine can now determine the compensation gains at step 60 using a weighting factor for each eight hour period. An empty seat humidity compensation gain EHG is calculated as follows:

$$EHG = T_{0\ to\ -7} * A_{0\ to\ -7} * KEHG1 + T_{-8\ to\ -15} * A_{-8\ to\ -15} * KEHG2 + \ldots + T_{-40\ to\ -47} * A_{-40\ to\ -7} * KEHG8$$

wherein KEHG1, KEHG2, . . . KEHG8 are predetermined weighting factors, which are preferably greater, generally, for more recent samples. Likewise, a threshold humidity compensation gain THG is calculated as follows:

$$THG = T_{0\ to\ -7} * A_{0\ to\ -7} * KTHG1 + T_{-8\ to\ -15} * A_{-8\ to\ -15} * KTHG2 + \ldots + T_{-40\ to\ -47} * A_{-40\ to\ -7} * KTHG8$$

wherein KTHG1, KTHG2, . . . KTHG8 are predetermined weighting factors, which are preferably greater, generally, for more recent samples.

Figure 7:
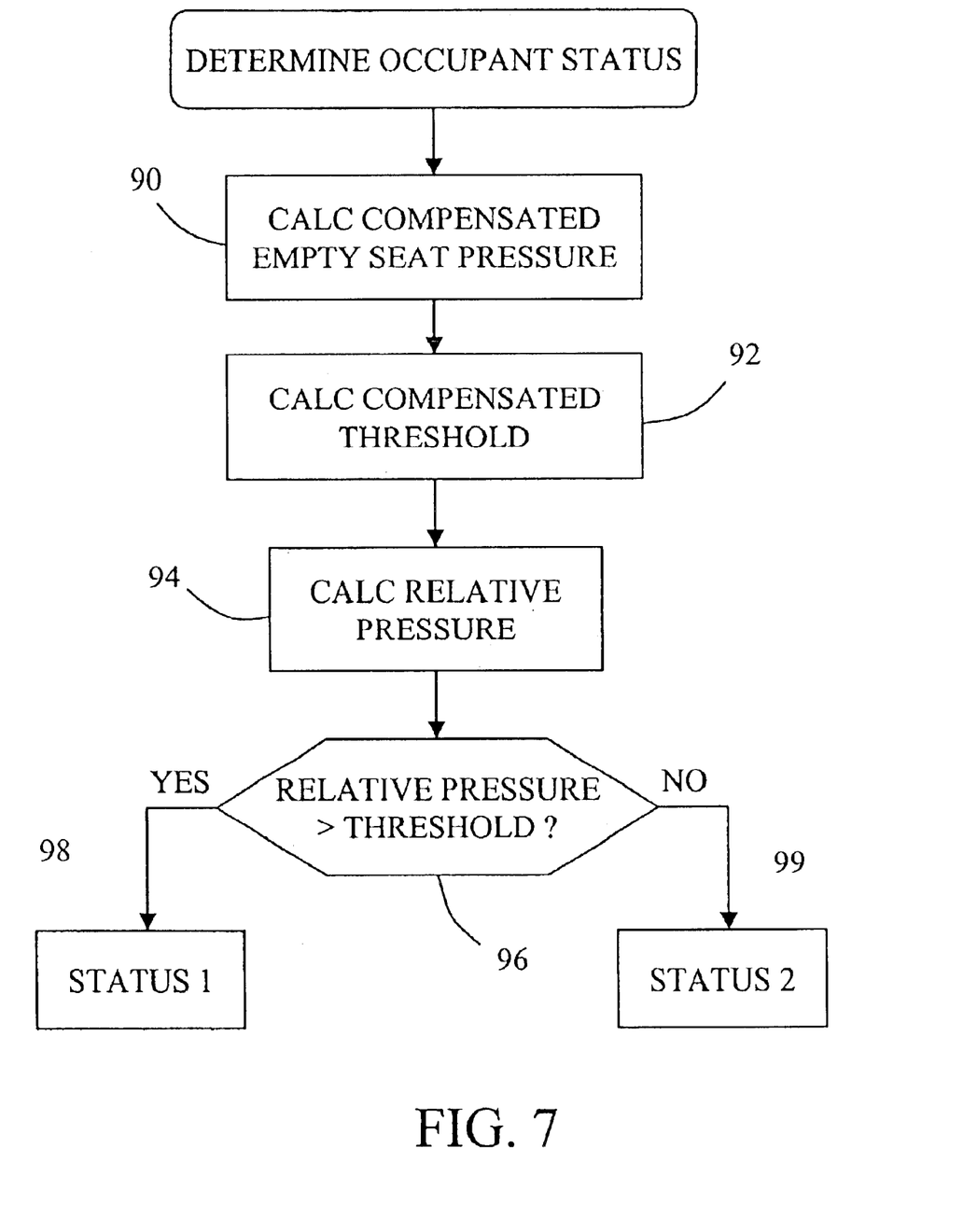
FIG. 7 is a computer flow chart of an occupant classification algorithm for use in the system of FIGS. 1 and 2.

The two humidity compensation factors EHG and THG are the outputs of routine HUMIDITY COMPENSATION and are used to modify values in an occupant status determination algorithm, the basic portion of which is shown in FIG. 7. Routine DETERMINE OCCUPANT STATUS begins at step 90 by calculating an empty seat pressure value compensated for humidity as follows:

Comp Empty Seat Pressure=Calibrated Empty Seat Pressure*$EHG$, wherein the Calibrated Empty Seat Pressure is a stored calibration value that was determined by reading the pressure sensor output in an installed occupant weight determination system under controlled environmental conditions (temperature, humidity), typically at the point of seat or vehicle assembly.

Figure 6:
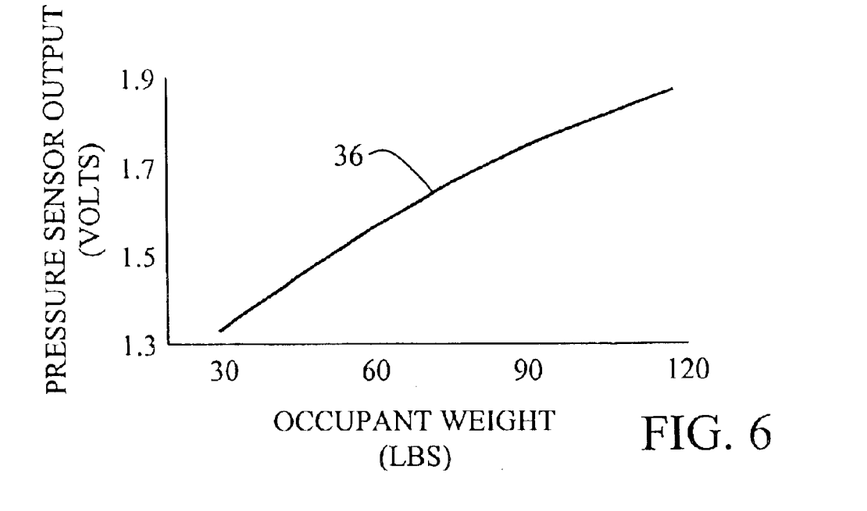
FIG. 6 is a graph showing a typical functional relationship between occupant weight and pressure sensor output voltage in the system of FIGS. 1 and 2.

Next, at step 92, the routine determines a threshold reference value compensated for humidity as follows:

Comp Threshold=Stored Threshold*$THG$, wherein the Stored Threshold is based on predetermined criteria defining the conditions under which the relevant airbag or similar restraint is to be deployed or not deployed in a detected vehicle crash event and is preferably determined by a test which may involve the dropping of an object having predetermined weight and shale onto a scat cushion in a predetermined manner and recording the pressure sensor reading, again under controlled environmental (temperature, humidity) conditions. Stored threshold values may be based on predetermined data such as that shown in FIG. 6 relating the pressure sensor output signal to the weight of a seat occupant and stored in a table for lookup on the basis of the pressure sensor output signal, filtered and/or processed as desired.

The Relative Pressure is then determined at step 94 as follows:

Relative Pressure=Pressure Sensor Output−Comp Empty Seat Pressure, wherein Pressure Sensor Output is the current output signal of the bladder pressure sensor, filtered as desired.

Finally, the Relative Pressure value is compared at step 96 to the compensated threshold value Comp Threshold. A first occupant status is declared at step 98 if Relative Pressure is greater than Comp Threshold; otherwise a second occupant status is declared at step 99. The first occupant status may be, for example, that an occupant is present in the seat; and the second occupant status may be, for example, that there is no occupant in the seat. The first occupant status would call for deployment of an airbag in a sensed crashed event, while the second occupant status would suppress deployment. Another example would identify the first occupant status with the presence of a heavy occupant such as an adult male, whereas the second occupant status would signify a light occupant such as a child or a fifth percentile female. In this case, the first occupant status would still provide for deployment of the airbag; but the second occupant status would either suppress deployment or deploy at a lower level. In any case, the accuracy of the weight calculation, and therefore of the occupant classification and deployment decision, would be improved by the compensation of the bladder pressure sensor output signal for moisture in the seat foam by means of humidity detection.

Figure 5:
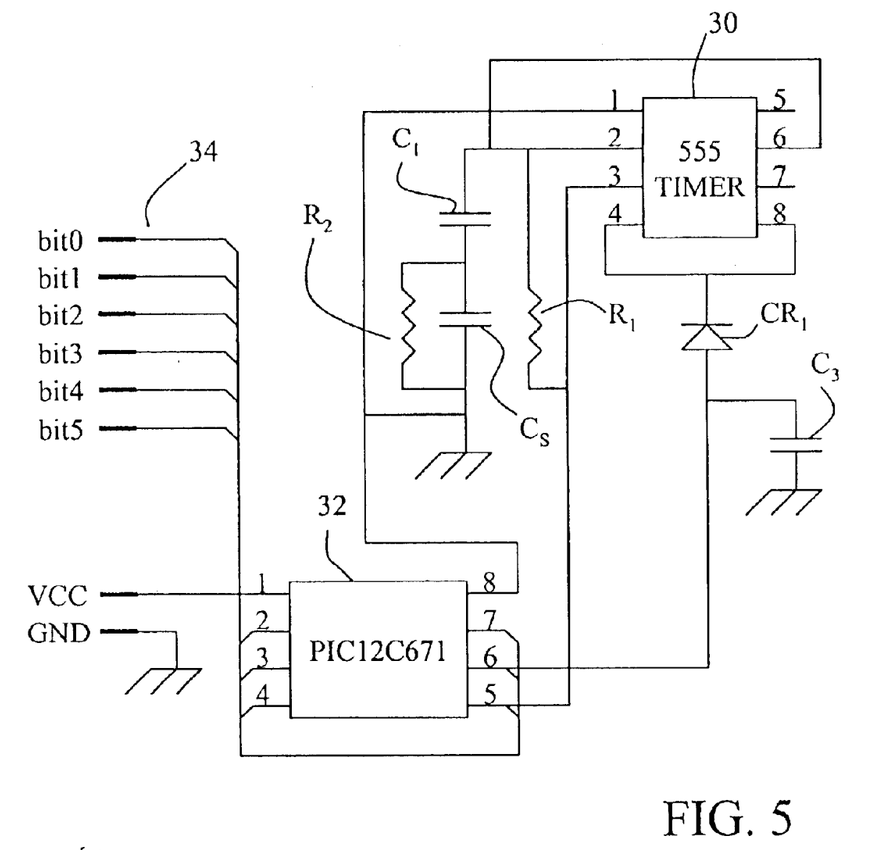
FIG. 5 is a circuit diagram of a humidity sensor for use in the system of FIGS. 1 and 2.

An example humidity sensor is described with reference to FIG. 5. The sensing element includes a commercially available capacitor chip $C_S$ that is designed to be highly responsive to relative humidity of the air around it and is mounted exposed to that air. It is electrically connected in an oscillator circuit built around a standard 555 timer chip 30. A PIC12C671 microprocessor chip 32 is programmed to repeatedly activate the oscillator for short periods by providing power to the 555 timer chip through diode CR1 and to receive a voltage signal from pin 3 (Vout) of the timer chip that oscillates at a variable frequency controlled by capacitor $C_S$. Microprocessor chip 32 measures the frequency (with reference to its own internal clock) and determines the relative humidity through a stored mathematical model or look-up table and stores the values thereof. When module 12 signals microprocessor chip 32, the latter communicates selected stored values of the relative humidity to module 12. But there is nothing about this circuit that is critical to the operation of the invention; and it could be easily replaced by many other relative humidity measuring circuits known in the art. The pin connections for the 555 timer chip are +Power (4, 8), Time C (2, 6), GND (1) and Vout (3). The pin connections for the microprocessor chip 32 are +Power (1), GND (8) at all times, data in/out (2–7) in data communication mode and power Out to oscillator (6) and oscillator voltage signal in (5) in oscillator activation mode (with pins 2–5 available for signalling from module 12).

Some seats employing foam seat cushions appear to exhibit a cross-correlation between humidity and temperature, due at least partly to the fact that the effect of moisture in the load transmission of a seat cushion foam varies with the absolute amount of water in the air trapped within the foam but the humidity parameter that is actually measured is relative humidity. The absolute volume of water in a given volume of air at a given value of relative humidity varies substantially with the temperature of the air; and this contributes significantly to the cross-correlation. For a seat wherein this humidity/temperature cross-correlation is sufficiently large, it may be compensated by substituting, for the measured relative humidity, a parameter $\Delta$ defined as follows:

$$\Delta = A*RH + B*T*RH + C*T^2*RH + K$$

wherein A, B, C are weighting constants, RH is the measured relative humidity, K is a constant and T is the measured temperature of the atmosphere in the vicinity of the pressure sensor and foam seat cushion. In this expression, the first term (A*RH) is the contribution of relative humidity; and the second and third terms together (B*T*RH+C*T$^2$*RH) comprise the cross-correlation contribution, with the T$^2$ term included due to the strongly non-linear variation in the relationship between relative humidity and absolute humidity through the temperature range. In practice the temperature could be measured each time the humidity is measured, and the value of $\Delta$ could be stored and used in place of the values of relative humidity in the method and apparatus of FIGS. 1–5 to provide the compensation factors for the method of FIGS. 6–7. Alternatively, the temperature and relative humidity values could be stored in linked memory locations with the value of $\Delta$ calculated as needed later in performing the remaining calculations. In either case, the value of $\Delta$ could alternatively be read from a three dimensional look-up table on the basis of relative humidity and temperature inputs.

Figure 8:
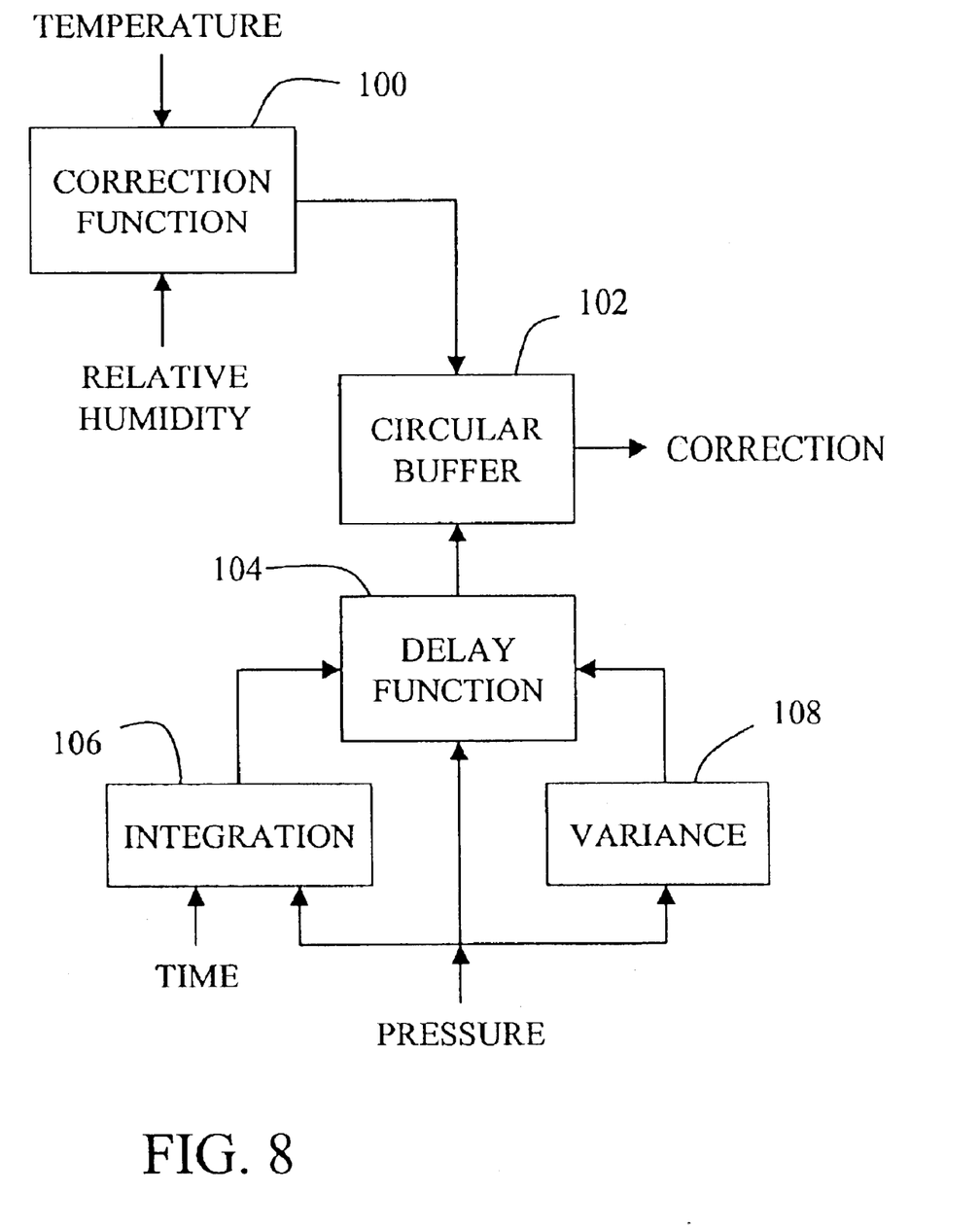
FIG. 8 is an alternate embodiment of a humidity compensation algorithm for use in the system of FIGS. 1 and 2.

An alternative embodiment of the invention is described with reference to FIG. 8, which is a top level block diagram of an algorithm, which can be performed by a programmed digital computer. Inputs to this cross-correlation algorithm include a temperature reading and a relative humidity reading. A non-linear correction function 100 contains terms including at least, but not limited to, a coefficient times temperature, a coefficient times humidity and a coefficient times the cross-product of humidity and temperature. In general, higher order polynomials in temperature and humidity may be included in an embodiment of this invention. In addition, cross-product terms with other system variables are envisioned. Such additional cross-product terms may include: pressure (related to weight), totalized (integrated, summed, etc.) weight, time and others. In this embodiment, the correction function 100 may be expressed His follows.

$$\Delta = A*T + B*RH + C*T*RH + D*T^2*RH + K$$

wherein T is air temperature near the seat cushion, RH is the relative humidity of air near the seat cushion, K is a constant, and A, B, C and D are weighting coefficients, usually constants. The third term—C*T*RH—is the basic term for the cross-correlation between temperature and relative humidity. The fourth term—D*T$^2$*RH—is a higher order cross-correlation term suggested by the strong non-linear curves relating relative humidity, absolute humidity and temperature. The determination of whether the last term is used in a particular case will depend on the degree of accuracy required and the calculating resources and time available.

The consecutive values of $\Delta$ are provided to a circular buffer 102, from which they are selected as required for use in the calculations to determine occupant classification as shown in the flow chart of FIG. 7. The buffer is used to introduce a controllable time delay into the process. The buffer has two pointers: a write (input) pointer and a read (output) pointer. New values of $\Delta$ are stored in the buffer as the write pointer advances regularly from one memory location to the next; but values are read out of the buffer according to the read pointer, which can be moved relative to the write pointer to provide a controlled, variable time delay between input and output values. The circular buffer is large enough to accommodate the longest allowable time delay without writing over required data.

The output pointer of circular buffer 102 is controlled according to a delay function 104, provided to account for time delay effects in the system, which are dominated by the delay of air exchange between the atmosphere and the foam seat cushion. This delay is important because the measured temperature and humidity are characteristics of the atmospheric air outside the foam while the load transmitting effects are produced by moisture within the foam. The delay is affected by many factors, including characteristics of the foam itself, the nature of the seat cushion covering and the timing and amount of seat activity—that is, the alternate compression and expansion of the foam that can greatly increase the rate of air exchange over that occurring due to diffusion with an unmoved cushion. An example of a delay function is given by the following:

$$\Gamma = \frac{\left(E * \int P + F * P\right)}{\sigma P}$$

wherein $\Gamma$ is the delay value, P is the pressure signal, $\int P$ is the time integral of the pressure signal, and $\sigma P$ is a variance value. E and F are weighting factors and are typically constants. The time integral of the pressure signal $\int P$ is derived in an integration function 106, which receives the pressure signal P and a time signal as inputs and integrates the pressure signal in a known manner. The variance signal $\sigma P$ is derived in a variance function 108, which receives the pressure signal P and may, as an example, be the same as or similar to the derivation of the activity factor described with respect to FIG. 4. The calculated delay factor $\Gamma$ is applied to the circular buffer to control the read (output pointer), with higher values of $\Gamma$ tending to increase the lag of the read pointer relative to the steadily moving write pointer by moving the former away from the latter and lower values of $\Gamma$ tending to decrease the lag by moving the read pointer close to the write pointer.

What is claimed is:

1. A vehicle seat occupant classification apparatus comprising:
   pressure responsive apparatus adapted for engagement with an underside of a foam seat cushion so as to respond to a weight of an occupant on an upper side of the foam seat cushion and generate a pressure signal therefrom;
   a humidity sensor adapted to respond to relative humidity of air adjacent the pressure responsive apparatus to generate a humidity signal;
   means for compensating at least one of the pressure signal, a stored reference pressure value and a stored threshold value in response to the humidity signal; and
   means for determining an occupant classification at least partly in response to the compensated one of the pressure signal, the stored reference pressure value and the stored threshold value.

2. The occupant classification apparatus of claim 1 wherein the stored reference pressure value represents a value of the pressure signal with no seat occupant and is the compensated one of the pressure signal, the stored reference pressure value and the stored threshold value.

3. The occupant classification system of claim 2 wherein the means for compensating further compensates the stored threshold value in response to the humidity signal and the means for determining an occupant classification is also responsive to the compensated stored threshold value.

4. The occupant classification apparatus of claim 1 further comprising;
   means responsive to dynamic variations of the pressure signal to generate a seat activity signal; and
   wherein the means for determining an occupant classification is further responsive to the seat activity signal.

5. The occupant classification system apparatus of claim 4 wherein the means responsive to dynamic variations of the pressure signal counts consecutive alternating excursions of signal magnitude above a first predetermined level and below a second predetermined level lower than the first predetermined level.

6. The occupant classification apparatus of claim 4 wherein the stored reference pressure value represents a value of the pressure signal with no seat occupant and is the compensated one of the pressure signal, the stored reference pressure value and the stored reference pressure value.

7. The occupant classification system of claim 6 wherein the means for compensating further compensates the stored threshold value in response to the humidity signal and the means for determining an occupant classification is also responsive to the compensated stored threshold value.

8. The occupant classification system of claim 1 wherein the pressure responsive apparatus comprises a bladder containing a non-compressible fluid and adapted for location under the foam seat cushion and a pressure sensor responsive to the pressure of the non-compressible fluid within the bladder.

9. The occupant classification system of claim 8 wherein the humidity sensor is packaged in a module with the pressure sensor but is not exposed to the non-compressible fluid within the bladder.

10. The occupant classification system of claim 1 further comprising a temperature sensor adapted to respond to temperature of air adjacent the pressure responsive apparatus to generate a temperature signal and means for further compensating the compensated one of the pressure signal, the stored reference pressure value and the stored reference pressure value in response to a cross-correlation value derived from the humidity signal and the temperature signal.

11. The occupant classification system of claim 10 wherein the cross-correlation value is derived from a product of the humidity and temperature signals.

12. The occupant classification system of claim 11 wherein the cross-correlation value is further derived from a product of the humidity signal and the square of the temperature signal.

13. A method of classifying an occupant in a vehicle seat having a foam seat cushion, the method comprising the steps:
   generating a pressure signal in response to the weight of an occupant transmitted through the foam seat cushion exerted;
   sensing relative humidity of air adjacent the seat cushion to generate a humidity signal;
   compensating at least one of the pressure signal, a stored reference pressure value and a stored threshold value in response to the humidity signal; and
   determining an occupant classification at least partly in response to the compensated one of the pressure signal, the stored reference pressure value and the stored threshold value.

14. The method of claim 13 wherein the stored reference pressure value represents a value of the pressure signal with no seat occupant and is the compensated one of the pressure signal, the stored reference pressure value and the stored threshold value.

15. The method of claim 14 further comprising the following steps:

compensating the stored threshold value in response to the humidity signal; and determining the occupant classification further in response to the compensated stored threshold value.

16. The method of claim 13 further comprising the steps;

generating a seat activity signal in responsive to dynamic variations of the pressure signal; and further compensating the compensated one of the pressure signal, the stored reference pressure value and the stored threshold value in response to the seat activity signal.

17. The method of claim 16 wherein the step of generating a seat activity signal further comprises counting consecutive alternating excursions of signal magnitude above a first predetermined level and below a second predetermined level lower than the first predetermined level.

18. The method of claim 16 further comprising the steps:

sensing temperature of air adjacent the pressure responsive apparatus to generate a temperature signal;

generating a cross-correlation compensation value in response to the humidity signal and the temperature signal; and further compensating the compensated one of the pressure signal, the stored reference pressure value and the stored threshold value in response to the cross-correlation value.

19. The method of claim 13 further comprising the steps:

sensing temperature of air adjacent the pressure responsive apparatus to generate a temperature signal;

generating a cross-correlation compensation value in response to the humidity signal and the temperature signal; and further compensating the compensated one of the pressure signal, the stored reference pressure value and the stored threshold value in response to the cross-correlation value.

20. The method of claim 19 wherein the cross-correlation value is derived from a product of the humidity and temperature signals.

* * * * *